United States Patent [19]
Matsuoka et al.

[11] Patent Number: 5,125,292
[45] Date of Patent: Jun. 30, 1992

[54] CONTROL SYSTEM FOR A POWER TRAIN

[75] Inventors: Toshihiro Matsuoka, Higashihiroshima; Eiji Nishimura, Hiroshima, both of Japan

[73] Assignee: Mazda Motor Corporation, Hiroshima, Japan

[21] Appl. No.: 565,432

[22] Filed: Aug. 10, 1990

[30] Foreign Application Priority Data

Aug. 10, 1989 [JP] Japan .................... 1-208482

[51] Int. Cl.⁵ .................................... F16H 59/32
[52] U.S. Cl. ......................... 74/844; 74/860; 74/863; 123/559.3
[58] Field of Search ............ 74/844, 857, 858, 859, 74/860; 123/559.3

[56] References Cited

U.S. PATENT DOCUMENTS

| | | | |
|---|---|---|---|
| 4,612,826 | 9/1986 | Greene | 74/863 |
| 4,620,420 | 11/1986 | Gloss et al. | 74/860 X |
| 4,858,496 | 8/1989 | Iwatsuki et al. | 74/844 X |
| 4,926,636 | 5/1990 | Tadokoro et al. | 74/860 X |

FOREIGN PATENT DOCUMENTS

| | | | |
|---|---|---|---|
| 0247010 | 12/1985 | Japan | 123/559.3 |
| 0001825 | 1/1986 | Japan | 123/559.3 |
| 0001826 | 1/1986 | Japan | 123/559.3 |
| 0003130 | 1/1987 | Japan | 123/559.3 |
| 0007931 | 1/1987 | Japan | 123/559.3 |

Primary Examiner—Dirk Wright
Attorney, Agent, or Firm—Fleit, Jacobson, Cohn, Price, Holman & Stern

[57] ABSTRACT

A control system for a power train having an engine, an automatic transmission, and a supercharger provided in an intake passage of the engine for supplying compressed air into a cylinder of the engine includes a first detector for detecting a demand for adding supercharging power, a second detector for detecting a demand for shifting the gear stage of the automatic transmission, and a controller for controlling both the supercharger and the automatic transmission in response to the first and the second detectors so that the supercharger and the automatic transmission have an interrelation with respect to the initiation of their respective operations when both the demand for adding the supercharger power and the demand for shifting the gear stage of the automatic transmission occur at the same time.

12 Claims, 13 Drawing Sheets

CONTROL SYSTEM FOR A POWER TRAIN

BACKGROUND OF THE INVENTION

1. Field of the Invention

The present invention relates generally to a control system for a power train which has an engine comprising a supercharger and an automatic transmission.

2. Description of the prior art

Generally, in an automatic transmission forming a power train of an automotive vehicle, a gear stage is controlled by sampling an actual vehicle speed and an engine load and referring to a shift change pattern prememorized in an engine control unit. Based on the vehicle speed and the engine load, a desirable gear stage is determined. The transmission is then shifted to the desirable gear stage.

In a power train having such an automatic transmission. for instance a power train such as the one disclosed in laid-open Japanese Patent Application No. 60-127832 (1985), in order to increase intake efficiency and engine output power, there is provided a mechanical supercharger driven by an output shaft of the engine.

SUMMARY OF THE INVENTION

According to the present invention, by providing a clutch in a transmission path between the engine output and the mechanical supercharger, and controlling the clutch to connect, i.e., engage, or disconnect, i.e., disengage. based on an engine load, the supercharger is controlled so to be operated to increase the amount of intake air in a high engine load region where a larger engine output is required.

Moreover, the present invention provides a control system for a power train which is capable of decreasing the shock applied to the power train, which has an automatic transmission and a supercharger. More specifically, the present invention provides a control system for a power train having a mechanical supercharger connected with an output shaft of an engine through a clutch, which is capable of decreasing the shock applied to the power train having the automatic transmission and the supercharger.

BRIEF DESCRIPTION OF THE DRAWINGS

The accompanying drawings show preferred embodiments of the present invention, in which.

DETAILED DESCRIPTION OF THE PREFERRED EMBODIMENTS

Figure 1:
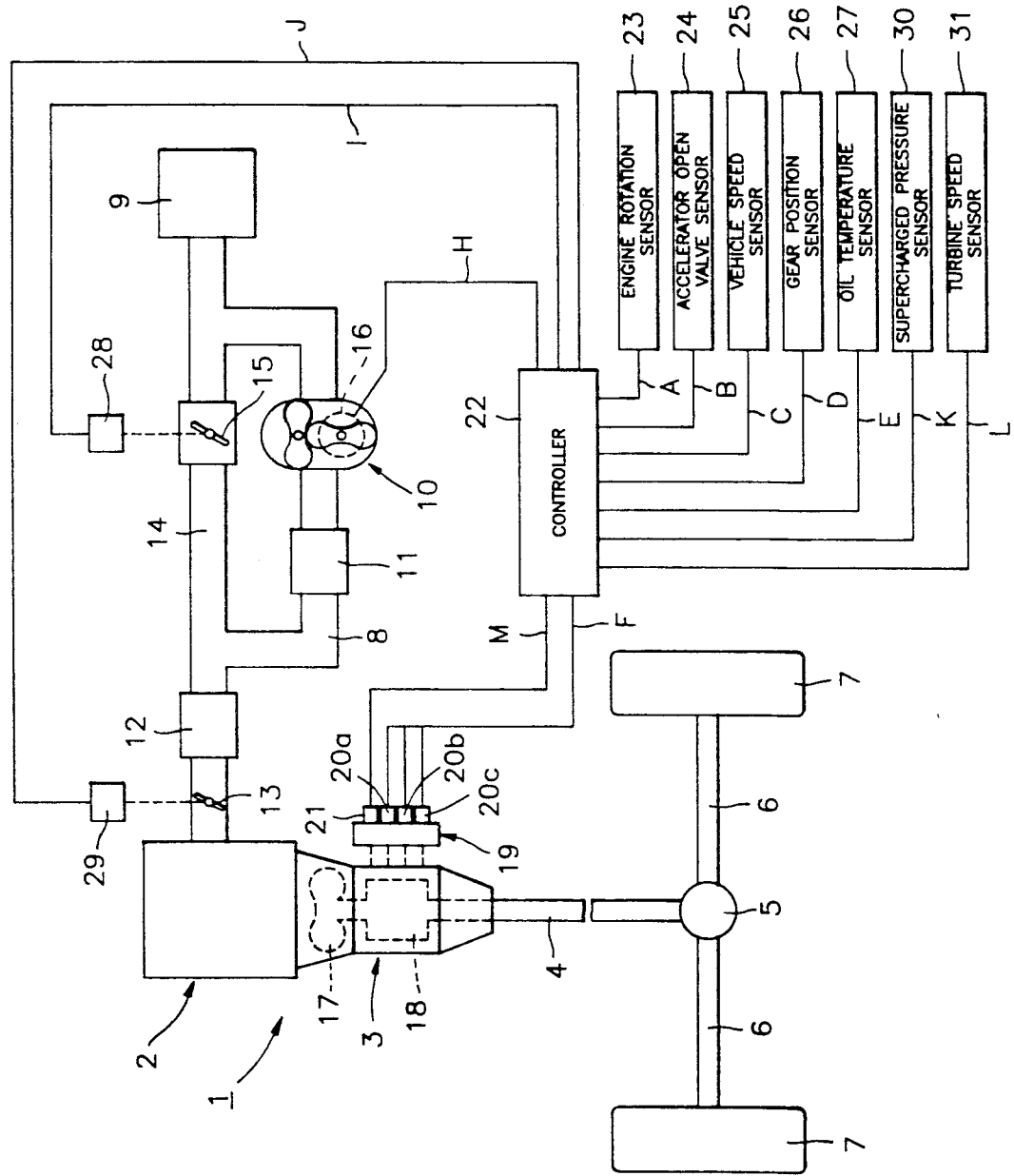
FIG. 1 is a schematic view of a power train and its control system in accordance with the present invention.

Referring now to the drawings, the inventive features of the present invention are described hereinafter.

As shown in FIG. 1, a power train 1 includes an engine 2, an automatic transmission 3, which has a plurality of gear stages, a differential gear unit 5, which is connected through a drive shaft 4 with the automatic transmission 3, and driving wheels 7 which are connected through shafts 6 with the differential gear unit 5.

In the power train 1 an intake passage 8 is provided to introduce intake air into an engine 2. In the intake passage, there are provided an air cleaner 9, a mechanical supercharger 10, an intercooler 11, an air flow meter 12 and a throttle valve 13, in this order from the upstream end to the downstream end of the intake passage 8. Also, in the intake passage 8, there is provided a bypass passage 14 in order to bypass the mechanical supercharger 10 and the intercooler 11. A bypass valve 15 is provided in the bypass passage 14.

The mechanical supercharger 10 is of the "roots blower" type, which is driven by an output shaft of the engine 2 through an electromagnetic clutch 16. The mechanical supercharger 10 compresses air introduced into the intake passage 8 from the air cleaner 9 so that the air can be delivered into cylinders of the engine 2 through the intercooler 11, the air flow meter 12 and the throttle valve 13. Bypass valve 15 is controlled so as to open when the mechanical supercharger 10 is stopped so that air can be introduced into the engine cylinders through the bypass passage 14. The degree to which bypass valve 15 is opened is controlled to adjust the air amount introduced into the engine cylinders through the bypass passage 14 in order to control the intake air pressure and keep intake air pressure at an optimum value.

The automatic transmission 3 includes a hydraulic torque convertor 17 connected with the engine output shaft, a speed change gear mechanism 18 interposed between the torque convertor 17 and the drive shaft 4, and a hydraulic control unit 19 which changes the power transit path by selectively engaging the frictional elements provided in the speed change gear unit 18. The hydraulic control unit 19 has a plurality of shift change solenoids 20a, 20b and 20c and a lock-up solenoid 21.

Further, in this power train system, there is provided a controller 22, which controls the throttle valve 13, the bypass valve 15, the electromagnetic clutch 16, the shift change solenoids 20a, 20b and 20c, and the lock-up solenoid 21. The controller 22 receives an input signal A from an engine speed sensor 23 which detects an engine speed, a signal B from an accelerator opening sensor 24 to detect the opening of an accelerator, a signal C from a vehicle speed sensor 25 which detects a vehicle speed, a signal D representing a gear position of the automatic transmission 3 from a gear position sensor 26, a signal E representing the oil temperature of the automatic transmission 3 from an oil temperature sensor 27, a signal K from a supercharged pressure sensor 30 which detects an intake air pressure downstream of the throttle valve 13, and a signal L from a turbine speed sensor 31 which detects a rotational speed of a turbine runner in the hydraulic torque convertor 17, i.e., an output speed of the torque convertor 17.

Controller 22 outputs shift change signals F to the shift solenoid valves 20a, 20b and 20c, and a lock-up signal M to the lock-up solenoid valve 21 so as to perform the shift change control and the lock-up control for the automatic transmission 3, based on the signals B and C obtained from the accelerator opening sensor 24 and the vehicle speed sensor 25.

In addition, the controller 22 performs the connecting and disconnecting controls for the electromagnetic clutch 16 in response to the accelerator opening degree detected by the sensor 24 and the gear stage of the automatic transmission 26. Further, the controller 22 performs the control for adjusting the opening of the bypass valve 15 in response to the accelerator opening degree and the gear stage when the electromagnetic clutch 16 is actuated so as to control the supercharged pressure. Therefore, the controller 22 outputs a clutch control signal H to the electromagnetic clutch 16 and a bypass control signal I to the actuator 28 for the bypass valve 15. Also, the controller 22 outputs a throttle control signal J so as to control the actuator 29 for the throttle valve 13 in response to the accelerator depression degree (in other words, in response to a vehicle acceleration demand made by the driver).

Figure 2:
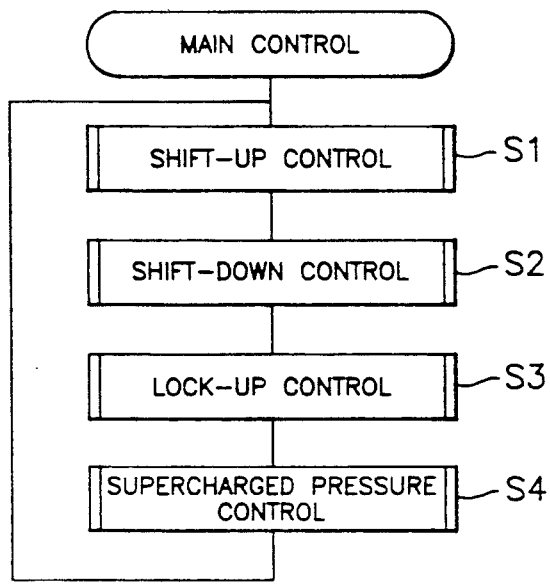
FIG. 2 is a flow diagram representative of a main control of the control system.
Figure 4:
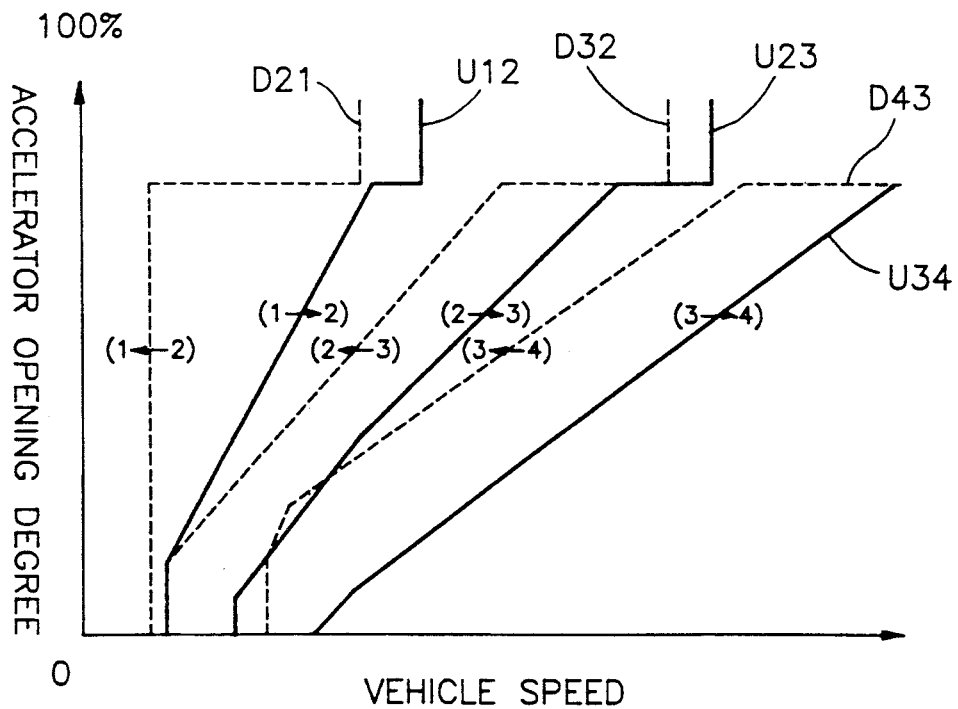
FIG. 4 is an explanatory view of a map used in the shift-up control and a shift-down control.

Hereinafter, referring now to FIGS. 2 to 19, the entire system control by the controller 22 is described in detail. FIG. 2 is a flow-chart showing a main routine. The controller 22 performs steps S1, S2 and S3 to control the shift-up, shift-down and lock-up operations for the automatic transmission 3 and step S4 to control the clutch and the supercharged intake air pressure for the supercharger.

Figure 3:
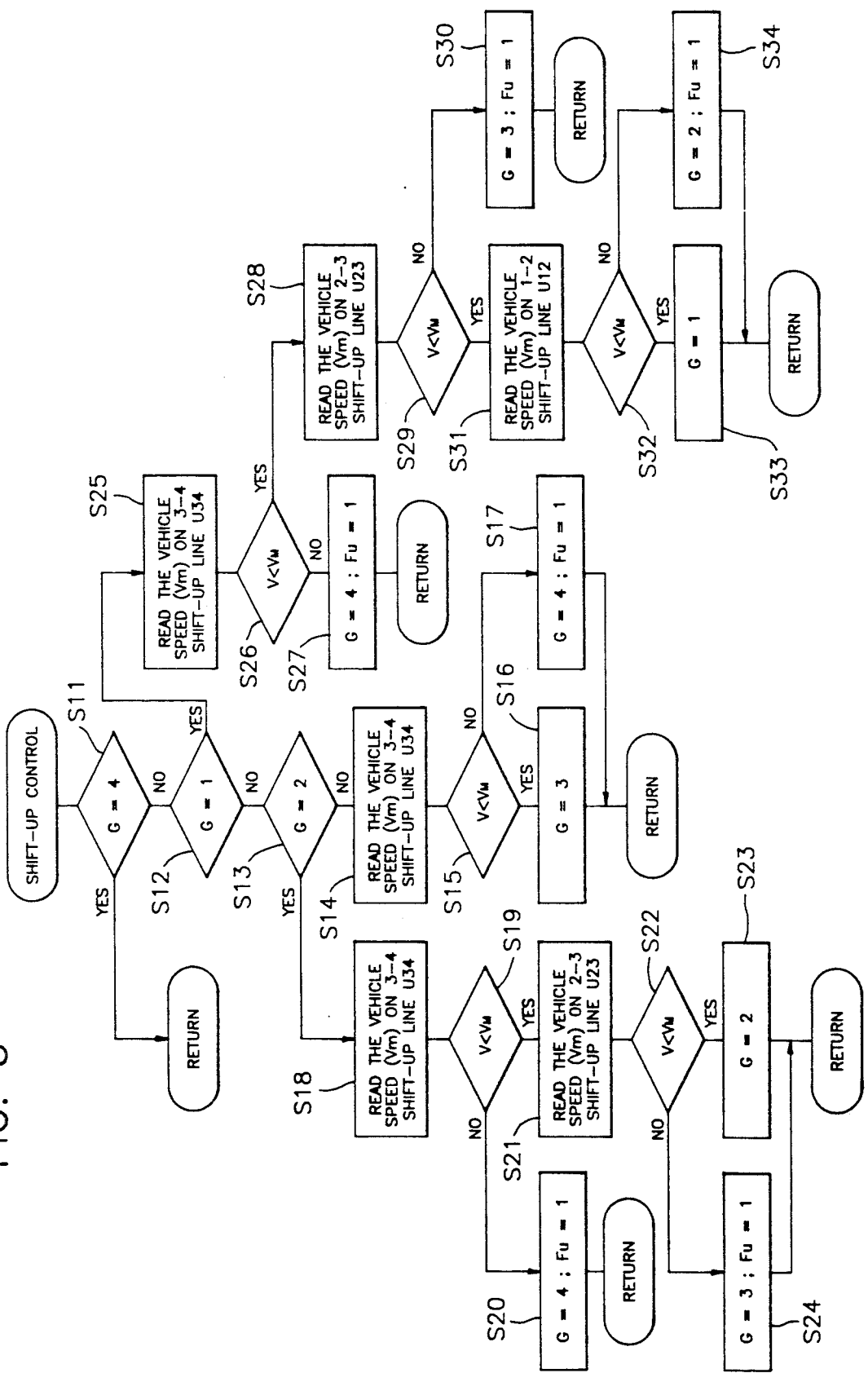
FIG. 3 is a flow diagram representative of a shift-up control of the main control.

The shift-up control is performed according to the subroutine which is represented by the flow chart shown in FIG. 3. The controller 22 judges the current gear position G in the steps S11, S12 and S13, depending on the signal from the gear position sensor 26. When the gear position is the fourth, or highest, gear stage (G=4), the control returns to the main routine. When the gear position is third gear stage (G=3), first of all, controller 22 looks up or recalls the shift change map shown in FIG. 5 which includes a plurality of shift-up lines U12, U23 and U34 and a plurality of shift-down lines D21, D32 and D43, which are predetermined and based on the accelerator opening degree and the vehicle speed parameters. Then, controller 22 reads, in step S14 a reference vehicle speed Vm, which corresponds to a vehicle speed on the 3–4 shift-up line U34 when the actual accelerator opening degree is A, and compares, in step S15, the reference vehicle speed Vm with the actual vehicle speed V detected by the vehicle speed sensor 25. If the actual vehicle speed V is smaller than the reference vehicle speed Vm, the controller 22 determines, in step S16, that it is appropriate to select the third gear stage, and does so. If the actual vehicle speed V is not smaller than the reference vehicle speed Vm, the controller 22 determines, in step S17, that it is appropriate to select the fourth gear stage, and does so, and also sets a shift-up flag Fu to "1".

When the gear position is the second gear stage (G=2), in step S18, the controller 22 reads a reference vehicle speed Vm on the 3–4 shift-up line U34 in the same manner as in step S14. In the next step, S19, the controller 22 compares the actual vehicle speed V with the reference vehicle speed Vm. When the actual vehicle speed V is not smaller than the reference vehicle speed Vm, the controller 22 determines that it is appropriate to select the fourth gear stage, and does so, and also sets the shift-up flag Fu to "1" in step S20. On the other hand, when the actual vehicle speed is smaller than the reference vehicle speed Vm, the controller 22 reads a reference vehicle speed Vm on the 2-3 shift-up line U23, corresponding to the actual accelerator opening degree, in step S21, and compares the reference vehicle speed Vm with the actual vehicle speed V in step S22. When the actual vehicle speed V is smaller than the reference vehicle speed Vm, the controller 22 determines that it is appropriate to select the second gear stage, and does so. When the speed V is not small, the controller 22 selects the third gear stage in step S24 and also sets the shift-up flag Fu to "1".

When the gear position is the first gear stage (G=1), similarly to when the gear position is in the second gear stage, the controller 22 reads a reference vehicle speed Vm on the 3–4 shift-up line U34, corresponding to the actual accelerator opening degree in step S25, and compares the actual vehicle speed V with the reference vehicle speed Vm in step S26. If the actual vehicle speed V is not smaller than the reference vehicle speed Vm, the controller 22 selects the fourth gear stage and sets the shift-up flag Fu to "1" in step S27. On the other hand, if the actual vehicle speed is smaller than the reference vehicle speed, as when the gear position is in the second gear stage, the controller 22 reads, in step S28, a reference vehicle speed Vm on the 2–3 shift-up line U23 and compares, in step S29 the actual vehicle speed V and the reference vehicle speed Vm. If the actual vehicle speed V is not smaller than the reference vehicle speed Vm, in step S30 the controller 22 selects the third gear stage and sets the shift-up flag Fu to "1".

In step S29, if the actual vehicle speed V is smaller than the reference vehicle speed Vm, the controller 22 reads, in step S31, a reference vehicle speed Vm on the 1–2 shift-up line U12, and compares, in step S32, the actual vehicle speed V with the reference vehicle speed Vm. If the actual vehicle speed V is smaller than the reference vehicle speed Vm, the controller 22 selects the first gear stage. If speed V not smaller than the reference vehicle speed Vm, the controller 22 selects the second gear stage and also sets the shift-up flag Fu to "1".

Figure 5:
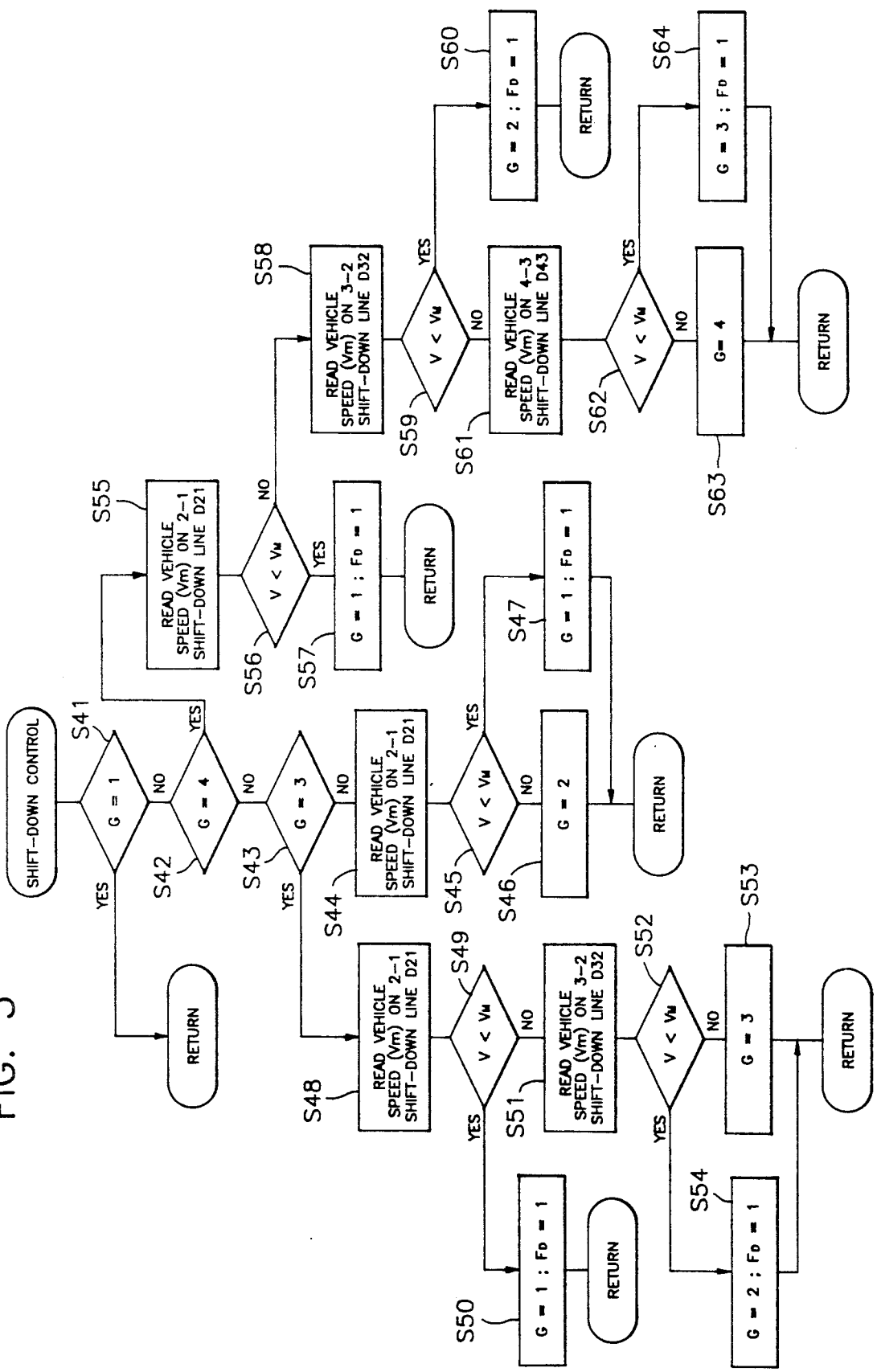
FIG. 5 is a flow diagram representative of a shift-down control of the main control.

Returning to the main control, the shift-down control is carried out according to a subroutine which is shown in detail in FIG. 5.

The controller 22 judges the current gear position G in steps S41, S42 and S43, depending on the signal from the gear position sensor 26. When the gear position is the first gear stage, i.e., the lowest gear stage (G=1), the program returns to the main routine. When the gear position is the second gear stage (G=2), as well as in the shift-up control, the controller 22 recalls the shift change map shown in FIG. 4. Controller 22 then reads, in step S44, a reference vehicle speed Vm which corresponds to a vehicle speed on the 2-1 shift-down line D21 when the actual accelerator opening degree is A, and compares the reference vehicle speed Vm with the actual vehicle speed V detected by the vehicle speed sensor 25 in step S45. If the actual vehicle speed V is not smaller than the reference vehicle speed Vm, the controller 22 selects the second gear stage in step S46. If the actual vehicle speed V is smaller than the reference vehicle speed Vm, the controller 22 selects the first gear stage and also sets a shift-down flag Fd to "1".

When the gear position is the 3rd gear stage (G=3), in step S48, the controller 22 reads a reference vehicle speed Vm on the 2-1 shift-down line D21 in the same manner as in step S44. In the next step, S49, the controller 22 compares the actual vehicle speed V with the reference vehicle speed Vm. When the actual vehicle speed V is smaller than the reference vehicle speed Vm, the controller 22 selects the first gear stage and also sets the shift-down flag Fd to "1" in step S50. On the other hand, when the actual vehicle speed is not smaller than the reference vehicle speed Vm, the controller 22 reads, in step S51, a reference vehicle speed Vm on the 3-2 shift-down line D32 corresponding to the actual accelerator opening degree, and compares the reference vehicle speed Vm with the actual vehicle speed V in step S52. When the actual vehicle speed V is not smaller than the reference vehicle speed Vm, the controller 22 selects the third gear stage in step S53. When the speed V is smaller than the reference vehicle speed Vm, the controller 22 selects, in step S54, the second gear stage, and also sets the shift-down flag Fd to "1".

When the gear position is the fourth gear stage (G=4), similarly to when the gear position is the third gear stage, the controller 22 reads a reference vehicle speed Vm on the 2-1 shift-down line D21 corresponding to the actual accelerator opening degree in step S55, and compares the actual vehicle speed V with the reference vehicle speed Vm in step S56. If the actual vehicle speed V is smaller than the reference vehicle speed Vm, the controller 22 selects the first gear stage and sets the shift-down flag Fd to "1" in step S57. On the other hand, if the actual vehicle speed is not smaller than the reference vehicle speed, the controller 22 reads a reference vehicle speed Vm on the 3-2 shift-down line D32 in step S58 and compares the actual vehicle speed V and the reference vehicle speed Vm in step S59. If the actual vehicle speed V is smaller than the reference vehicle speed Vm, the controller 22 selects the second gear stage in step S60 and sets the shift-down flag Fd to "1".

In the step S59, if the actual vehicle speed V is not smaller than the reference vehicle speed Vm, in step S61 the controller 22 reads a reference vehicle speed Vm on the 43 shift-down line D43, and compares the actual vehicle speed V with the reference vehicle speed Vm. If the actual vehicle speed V is not smaller than the reference vehicle speed Vm, the controller 22 selects the fourth gear stage. If the actual vehicle speed is smaller than the reference speed, the controller 22 selects the third gear stage and also sets the shift-down flag Fd to "1" in step S64.

Returning to the main control, the lock-up control is carried out by delivering the lock-up signal M, which is produced based on the accelerator opening degree and the vehicle speed detected by the sensors 24, 25, to the lock-up solenoid 21 to engage or disengage a lock-up clutch (not shown) in the hydraulic torque convertor 17 according to the vehicle running condition.

Figure 6:
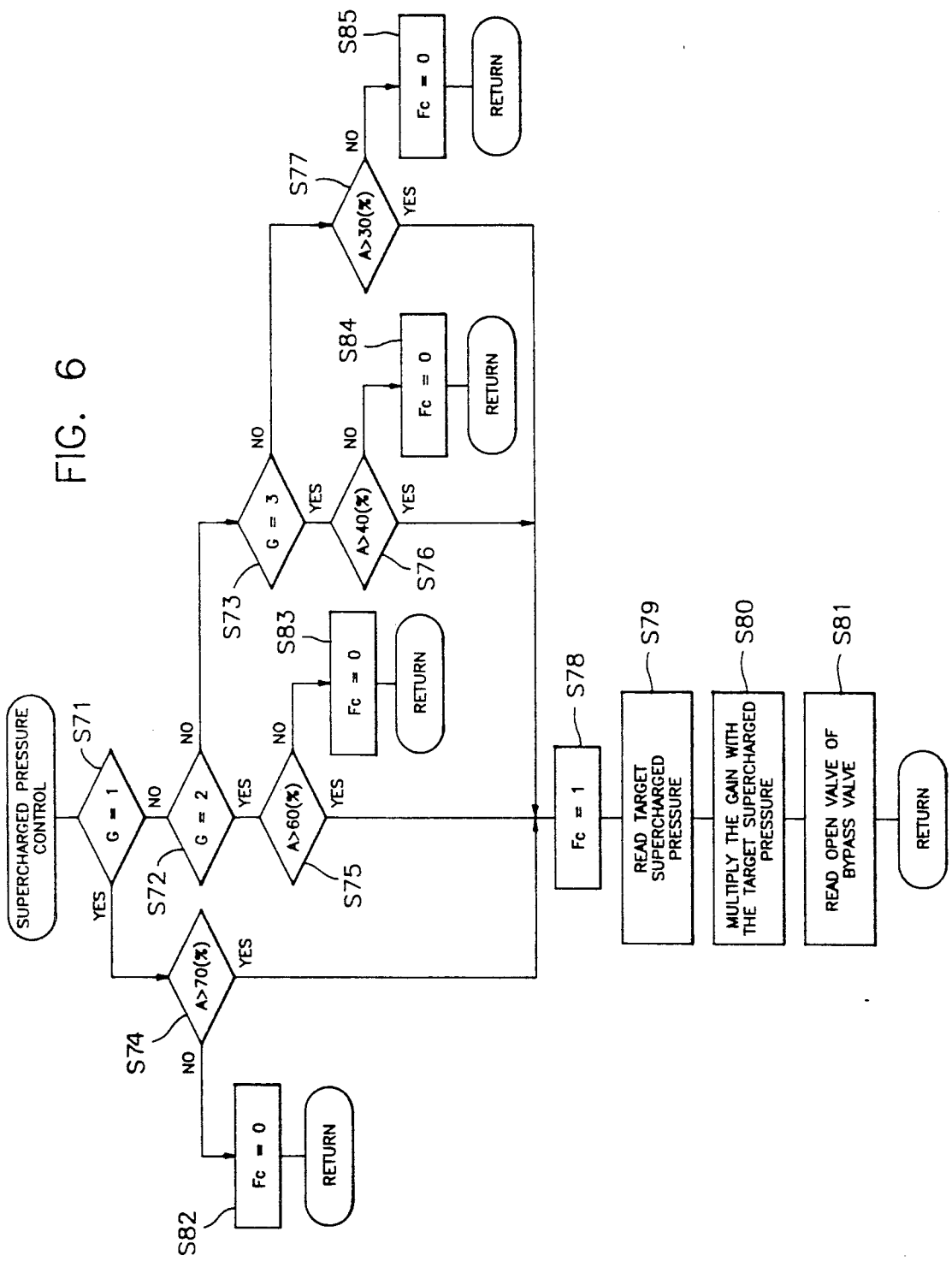
FIG. 6 is a flow diagram representative of a supercharged pressure control of the main control.
Figure 7:
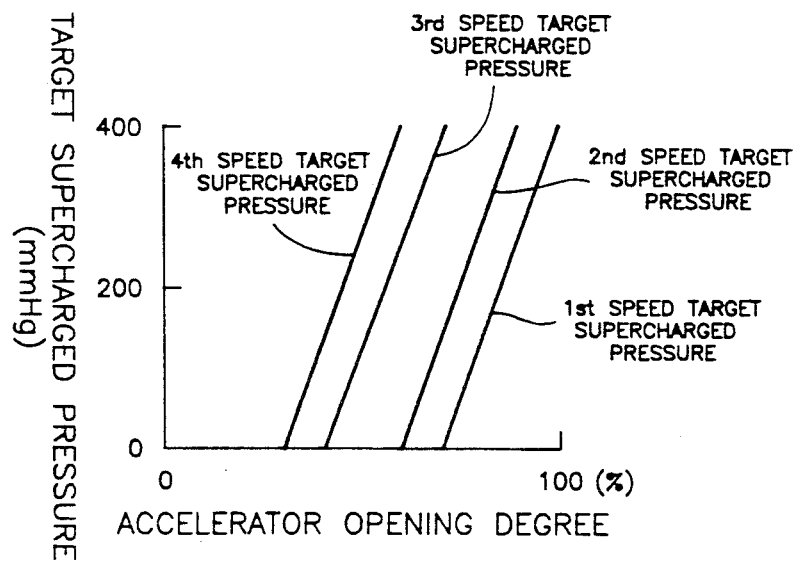
FIG. 7 is an explanatory view of a map representative of a target supercharged pressure which is used for the supercharged pressure control.
Figure 8:
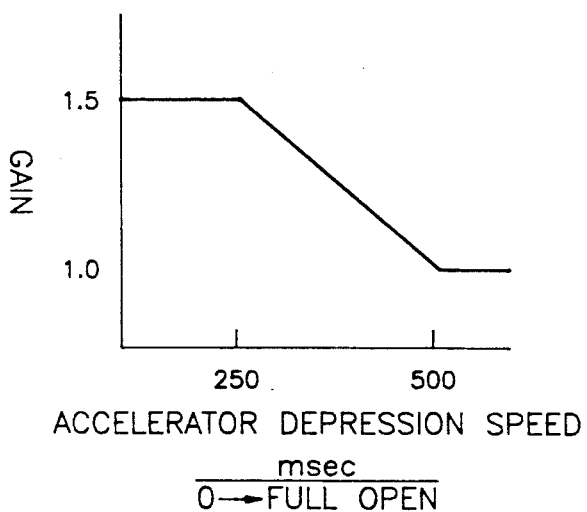
FIG. 8 is an explanatory view of a map representative of a gain for an accelerator depression speed, which is used for the supercharged pressure control.
Figure 9:
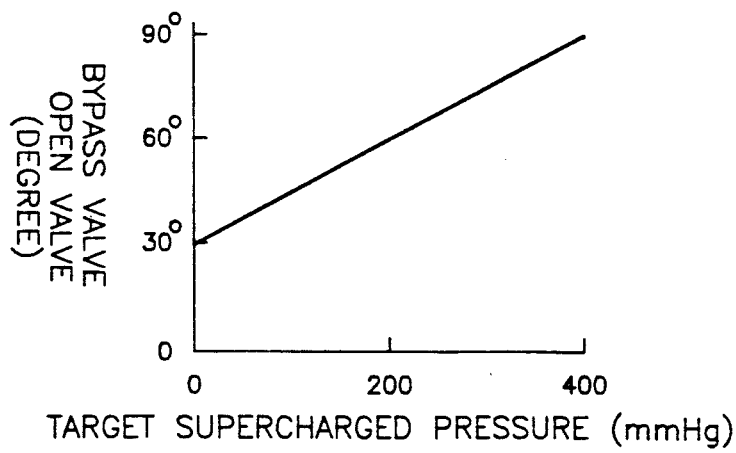
FIG. 9 is an explanatory view of a map representative of a bypass valve open value for the target supercharged pressure, which is used for the supercharged pressure control.
Figure 10:
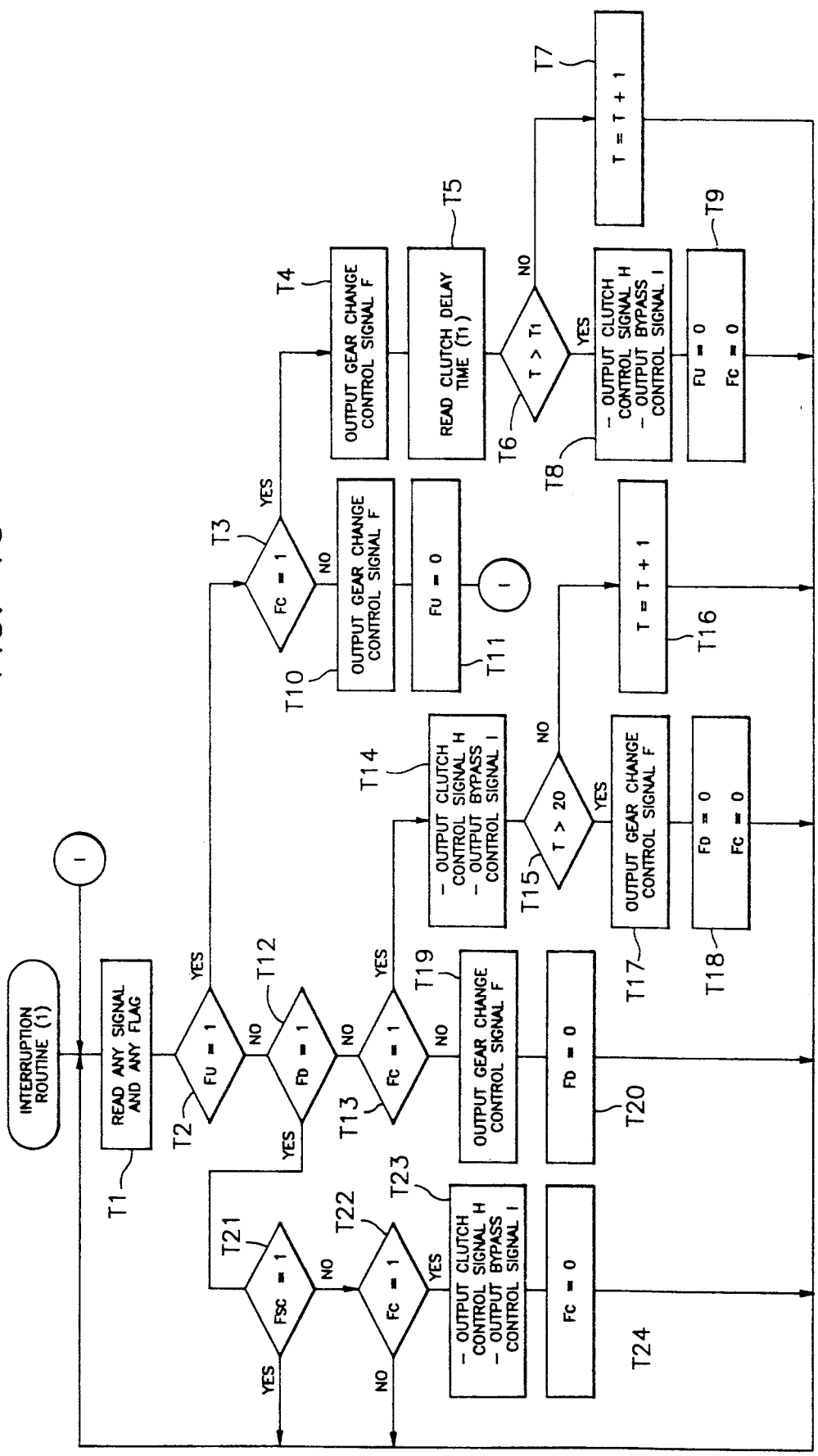
FIG. 10 is a flow diagram representative of an interruption routine (1) of the first embodiment in accordance with the present invention.

On the other hand, the supercharger control of the main routine indicated in step S4 in FIG. 2 is performed according to the flow chart of FIG. 6. In this control, first of all, in steps S71 to S73, the controller 22 detects the gear position of the automatic transmission 3. Then, in steps S74 to S77, the controller 22 judges if the accelerator opening degree A is greater than the predetermined opening degree in each gear stage. When the accelerator opening degree A is greater than 70% in the first gear stage, or greater than 60% in the second gear stage, or greater than 40% in the third gear stage, or greater than 30% in the fourth gear stage, and the engine load is greater than the predetermined load value in each gear stage, the controller 22 actuates the electromagnetic clutch 16 to connect the mechanical supercharger 10 with the output shaft of the engine 2 and also sets the clutch flag Fc to "1" in step S78. Further, the controller 22 reads a target supercharged pressure, based on the accelerator opening degree and the gear position, from a map shown in FIG. 7 in step S79. In addition, the controller 22 reads a gain value according to an accelerator depression speed from FIG. 8, and multiplies the gain value with the target supercharged pressure in step S80. Still further, the controller 22 reads, from FIG. 9, an opening degree of the bypass valve 15.

On the other hand, when the accelerator opening degree A is less than 70% in the first gear stage, or less than 60% in the second gear stage, or less than 40% in the third gear stage, or less than 30% in the fourth gear stage, the controller 22 resets the clutch flag Fc to "0" and returns to the main routine (see steps S82 to S85). In such a condition, the electromagnetic clutch 16 is kept in disengaged state, and the supercharger 10 cannot be driven. Also, in this low engine load condition, the bypass valve 15 is kept in a fully opened condition, and intake air can be introduced into cylinders of the engine 2 through the bypass passage 14 when the piston accommodated in each cylinder causes a suction movement.

Figure 12:
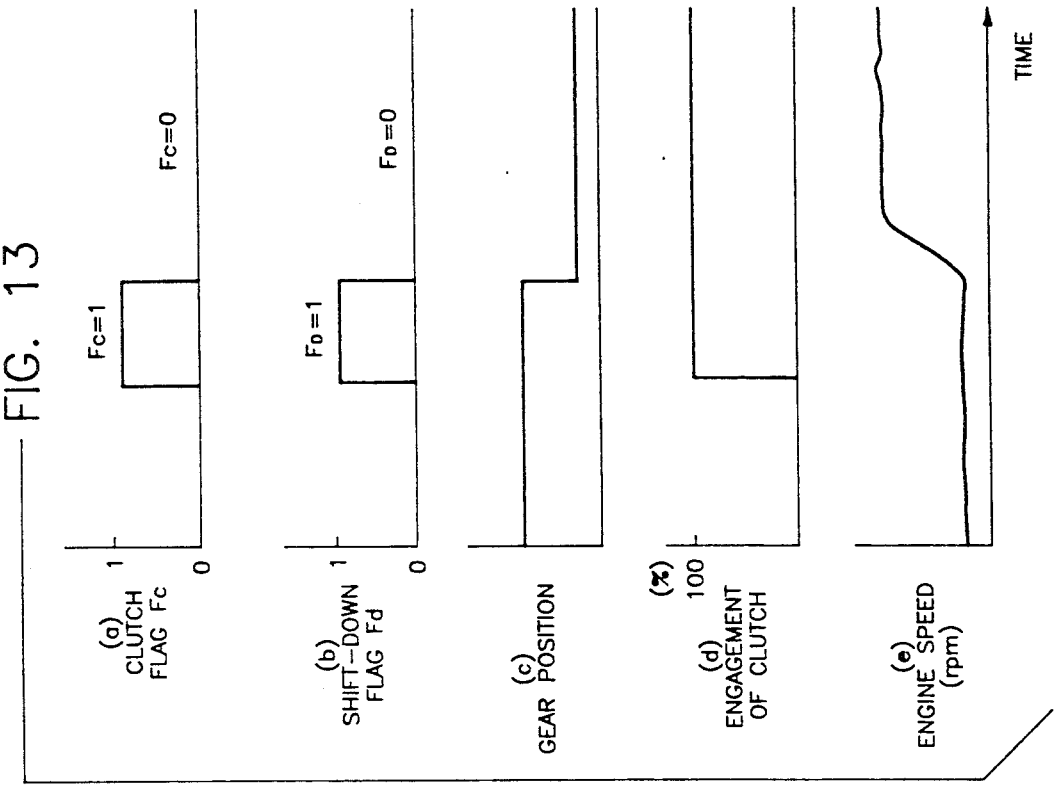
FIG. 12 is an explanatory view of a shift-up operation of the first embodiment.

In accordance with the present invention, the controller 22 performs an interruption routine, based on a predetermined time schedule, as well as main routine. The interruption routine is performed according to FIG. 10. First of all, in step T1, the controller 22 receives the input signals A, B, C, D and E obtained by the sensors 23 to 27 in FIG. 1, and values of the flag Fu, Fd and Fc. Then, in, step T2, the controller 22 judges if the shift-up flag Fu is "1" or not. If the flag Fu is "1", the controller 22 proceeds to step T3 and judges if the clutch flag Fc is set to "1" or not. If the flag Fc is "1", that is, both a shift-up requirement and a supercharging requirement happen at the same time, the controller 22 outputs the signal F to the shift change solenoids 20a, 20b and 20c in step T4 so that the automatic transmission 3 can be shifted to a desired gear stage. By this control, for instance, as shown in FIG. 12 (c), the speed change gear mechanism 18 is changed from the second gear stage to the third gear stage.

Figure 11:
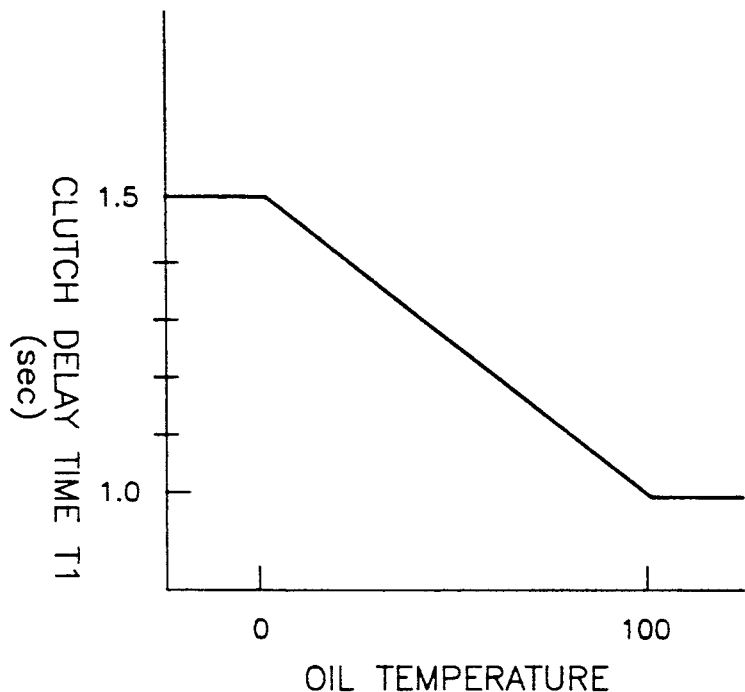
FIG. 11 is an explanatory view of a map representative of a clutch delay time for an oil temperature, which is used for the interruption routine (1)

Further, the controller 22 reads a clutch delay time T1 from a predetermined clutch delay time map in step T5. The clutch delay time T1 is determined so as to be larger as the oil temperature of the automatic transmission 3 decreases as shown in FIG. 11. Then, the controller judges if the timer T exceeds the clutch delay time T1 or not in step T6. If not, the timer T is incremented by adding "1" in step T7. If the timer T exceeds T1, the controller 22 outputs the clutch control signal H to the electromagnetic clutch 16 so that the electromagnetic clutch 16 can be tightly engaged, and the bypass valve control signal I to the actuator 28 for the bypass valve 15 so that the opening degree of the bypass valve 15 is controlled so as to be a desired value set in the step S81 in FIG. 6. After that, the controller 22 resets the flag Fu and Fc to "0".

In this control, when the demand for a shift-up and for supercharging happen at the same time, the shift-up operation and electromagnetic clutch actuation for supercharger 10 are intentionally carried out to have an sufficient time interval between these two operations. Accordingly, driving feeling can be kept good, since the shock of the shift-up and electromagnetic clutch engagement never occur at the same time.

Furthermore, in the shift-up operation, the electromagnetic clutch engagement is controlled to delay the shift-up operation. Therefore, as shown in FIG. 12 (e), the electromagnetic clutch 16 is engaged after engine speed has been dropped. A shock caused by clutch engagement is greatly decreased because the rotational speed difference between the engine output shaft and the stopped supercharger driving shaft is smaller. The durability of the electromagnetic clutch 16 and the supercharger 10 is also increased.

Since the clutch delay time T1 is determined to be larger as the oil temperature of the automatic transmission 3 becomes lower, the shift change shock and clutch engagement shock can be prevented from occurring at the same time even if the completion of the shift change operation takes a longer time due to large viscosity of the actuator oil in the low temperature.

When the clutch control flag Fc is "0" in step T3, the controller 22 outputs the gear change control signal F in step T10 and resets the shift-up flag Fu to "0" in step T11.

On the other hand, when the shift-up flag Fu is not "1" in step T2, the controller 22 judges if the shift-down flag FD is "1" or not in step T12. If flag FD is "1", the controller 22 further judges if the clutch control flag Fc is "1" or not in step T13. When flag Fc is "1", that is, when the shift-down requirement and the supercharging requirement happen at the same time, first of all, the controller 22 outputs the clutch control signal H and the bypass control signal I to the electromagnetic clutch 16 and the bypass valve 15, respectively, in step T14. Then, in step T15, the controller 22 judges if the timer exceeds the predetermined time value (=20) or not. This predetermined time value 20 corresponds to 300 msec, since each interrupt timer count T equals 15 msec. If timer count T does not exceed the predetermined value, the timer is incremented in step T16 by adding "1". If the timer count exceeds the predetermined value, the controller 22 outputs the gear change control signal F to the shift solenoid valves 20a, 20b and 20c in step T17, and resets the shift-down flag Fd and the clutch control flag Fc to "0" in step T18.

In this control, when a demand for the shift-down and for the supercharging happen at the same time, the shift-down operation and electromagnetic clutch actuation for supercharger 10 are intentionally carried out to have a sufficient time interval between these two operations. Accordingly, a good driving feeling can be kept, since the shock of the shift-down and electromagnetic clutch engagement never occur at the same time.

Figure 13:
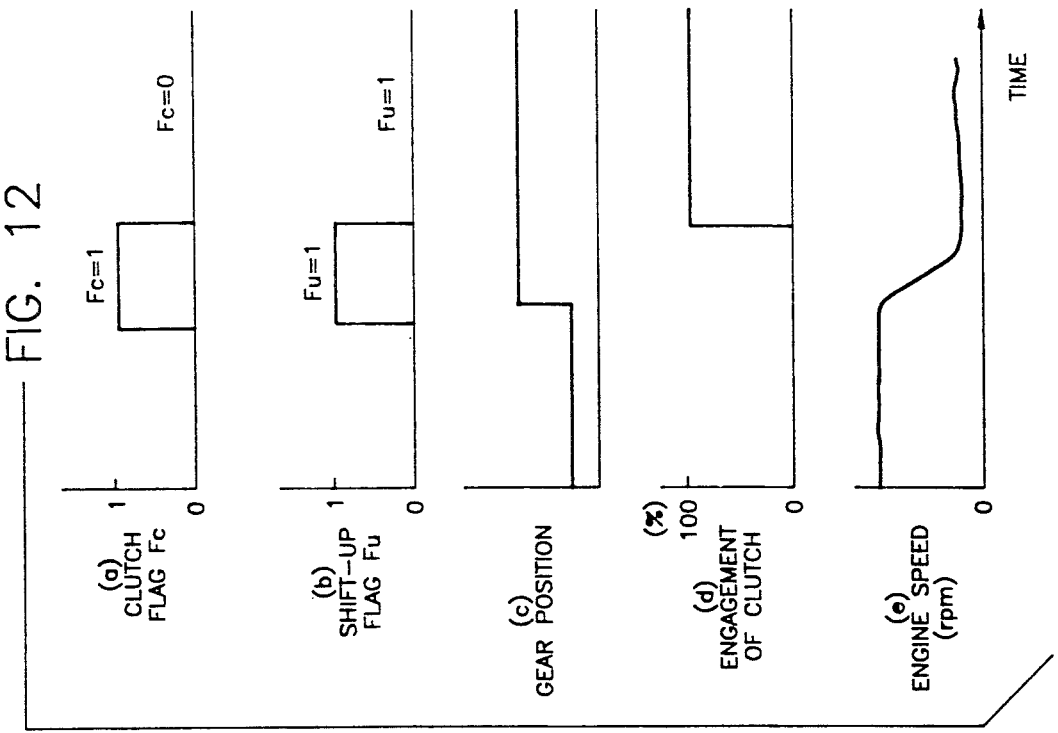
FIG. 13 is an explanatory view of a shift-down operation of the first embodiment.

Furthermore, in the shift-down operation, the electromagnetic clutch engagement is controlled so as to be initiated prior to the shift-down operation. Therefore, as shown in FIG. 13 (e), the electromagnetic clutch 16 is engaged before engine speed has been raised. A shock caused by clutch engagement is decreased because the rotational speed difference between the engine output shaft and the stopped supercharger driving shaft is smaller. The durability of the electromagnetic clutch 16 and the supercharger 10 is also increased.

When the clutch control flag Fc is not "1" in step T13, the controller 22 outputs the gear change control signal F to the shift change solenoid valves 20a, 20b and 20c in step T19, and resets the flag Fc to "0".

In addition, if the shift-down flag FD is not "1" in step T12, namely, both the flag Fu and the flag FD are "0", in step T21, the controller 22 judges if the automatic transmission 3 is in a shift change operation. If the judgment is "yes" and flag Fsc=1, the program returns to its starting point. If the judgment is "No", the controller 22 proceeds to step T22 and judges if the flag Fc is "1" or not. When flag Fc is "1", the controller 22 outputs the clutch control signal H and the bypass control signal I to the electromagnetic clutch 16 and the actuator 28 of the bypass valve 15, respectively, in step T23 and resets the flag Fc to "0" in step T24.

Figure 14:
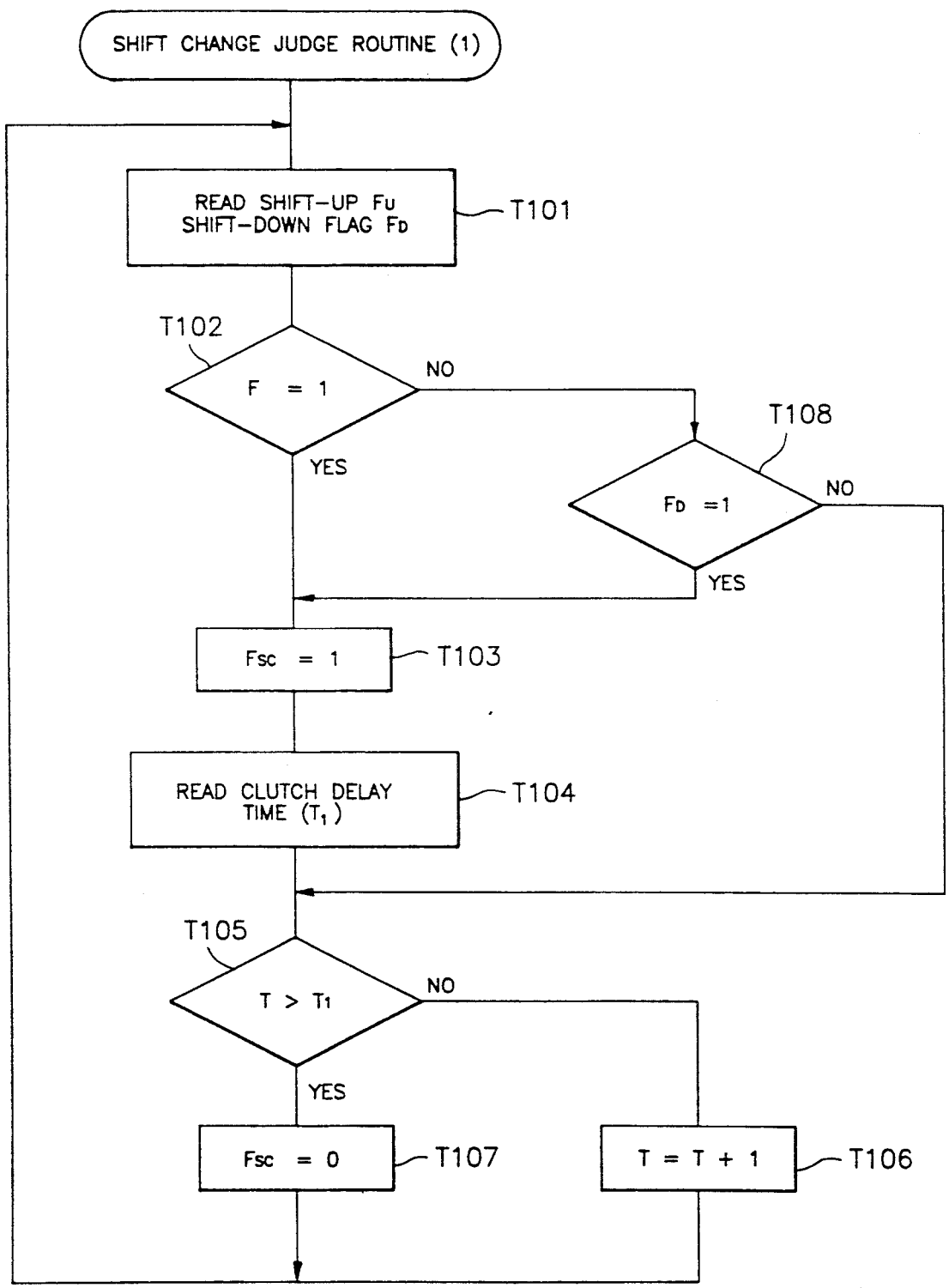
FIG. 14 is a flow diagram representative of shift change judge routine (1)
Figure 15:
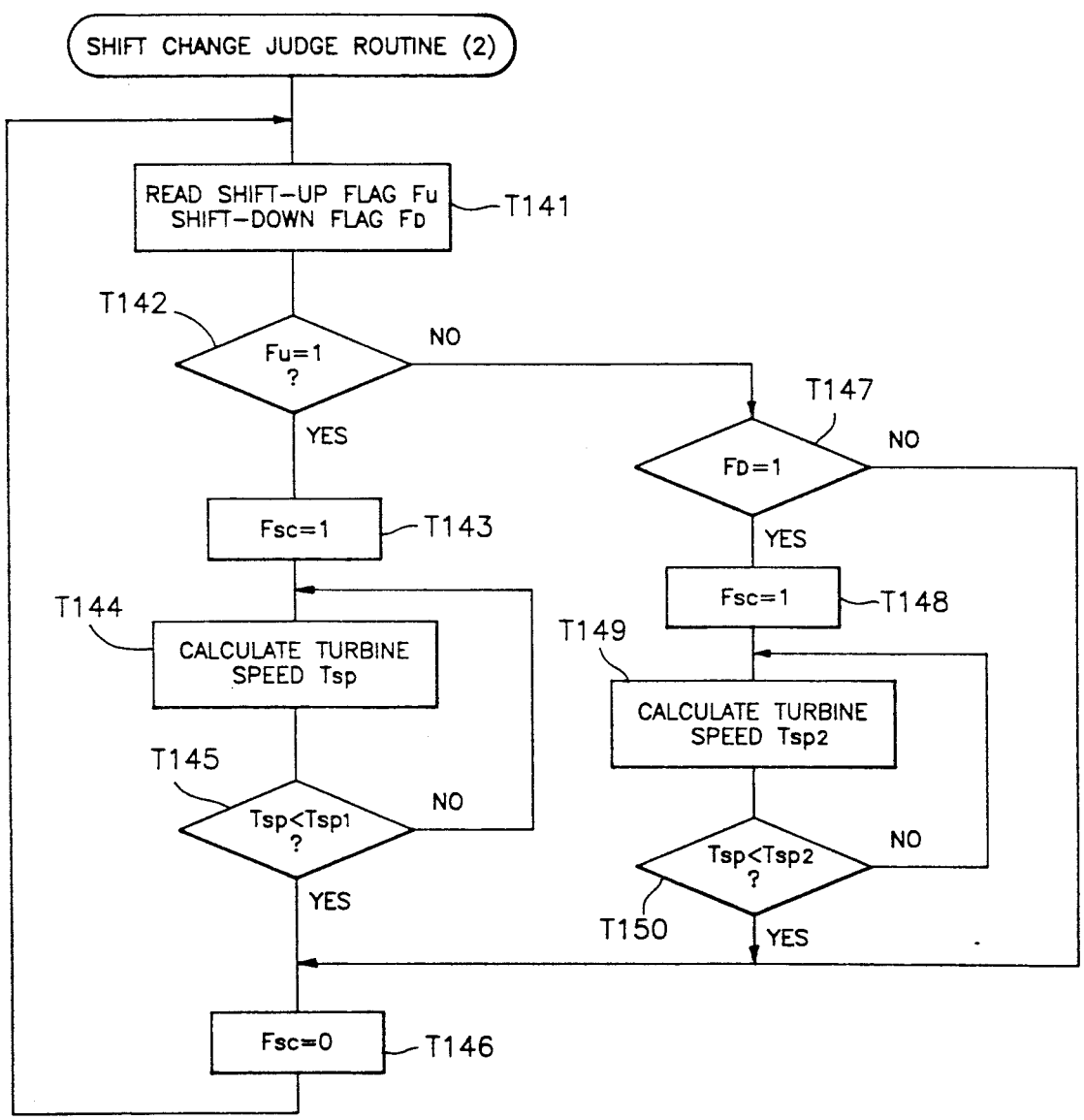
FIG. 15 is a flow diagram representative of shift change judge routine (2)

Referring now to FIG. 14, a shift change judge routine (1) is explained hereinafter. This shift change judge routine (1) is an interruption routine carried out in accordance with the main routine.

The controller 22 reads the shift-up flag Fu and the shift-down flag FD in step T101, and judges, in step T102, if the flag Fu is "1" or not in step T102. If flag Fu is "1", the controller 22 sets the shift change flag Fsc to "1" in step T103. Then, the controller 22 reads a clutch delay time T1, which is predetermined, from a clutch delay time map of FIG. 11 in step T104. Further, the controller 22 judges if timer count T exceeds the clutch delay time T1 in step T105. If not, the timer is incremented in step T106 by adding "1". If the timer count T exceeds the clutch timer T1, the controller 22 resets the flag Fsc to "0" in step T107. When the flag Fu is not "1" in the step T102, the controller 22 judges if the flag FD is "1" or not in step T108. If flag FD is "1", the controller 22 proceeds to step T103. If not, the controller 22 proceeds to step T105.

In the shift change judge routine (I), the controller 22 predicts the timing of the completion of shift change in response to the oil temperature of the automatic transmission 3. Accordingly, the controller does not determine the completion of the shift change until the timer count exceeds the clutch delay time T1. Therefore, even if the clutch control flag Fc is "1", the clutch control signal H and the bypass control signal I are prevented from being output during shift change period predicted, i.e., determined by the clutch delay timer.

A shift change judge routine (2) can be utilized instead of the judge routine (1). The controller 22 reads the shift-up flag Fu and the shift-down flag FD in step T141, and judges if the flag Fu is "1" or not in step T142. If flag Fu is "1", the controller 22 sets the shift change flag Fsc to "1" in step T143. Then, the controller 22 calculates the turbine speed Tsp1 in step T144. Further, the controller 22 judges if the turbine speed Tap is less than the predetermined value Tsp1, which is determined in accordance with the vehicle speed and the gear stage, in step T145. If the judgment in step T145 is "yes", the controller 22 resets the flag Fsc to "0" in step T146. If not, the controller 22 returns to the step T144.

When the flag Fu is not "1" in the step T142, the controller 22 judges if the flag FD is "1" or not in step T147. If the judgment in step T147 is "yes", the controller 22 sets the flag Fsc to "1" in step T148. Then, the controller calculates the turbine speed Tsp2 in step T149, and further judges if the turbine speed Tsp is less than the predetermined value Tsp2, which is also determined according to the vehicle speed and the gear stage, in step T150. If the judgment in step T150 is "yes", the controller 22 proceeds to the step T146. If not, the controller 22 returns to the step T149. When the flag Fd is not "1" in the step T147, the controller 22 proceeds to the step T146.

Figure 17:
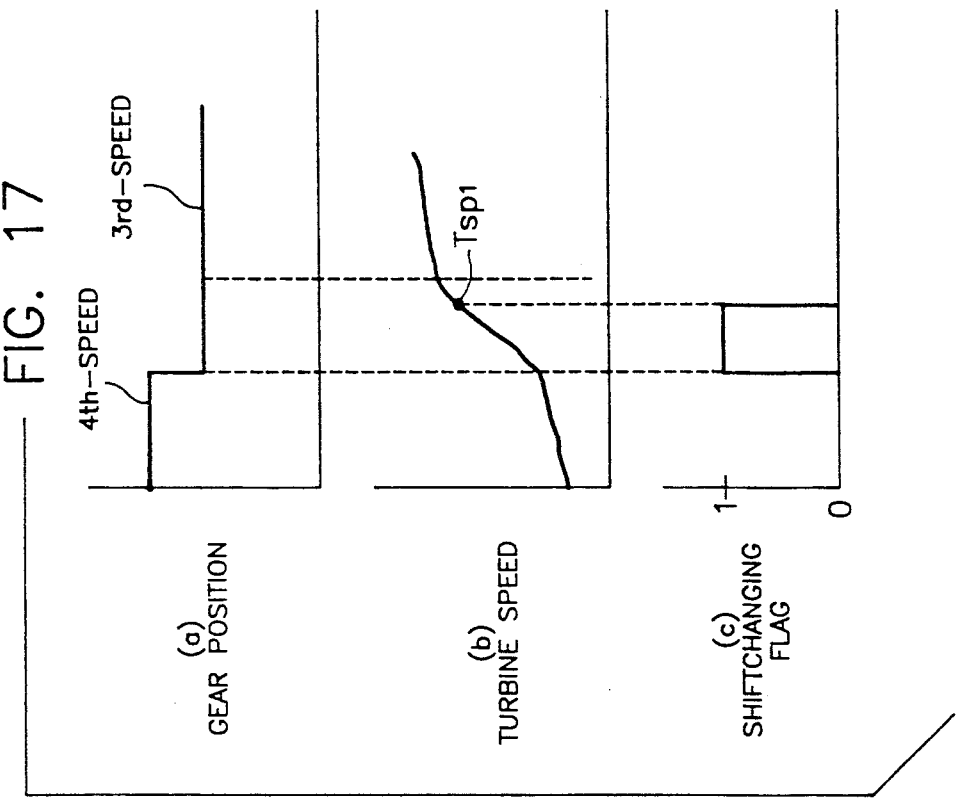
FIG. 17 an explanatory view of shift-down operation from fourth gear to third gear in accordance with the shift change judge routine (2)
Figure 16:
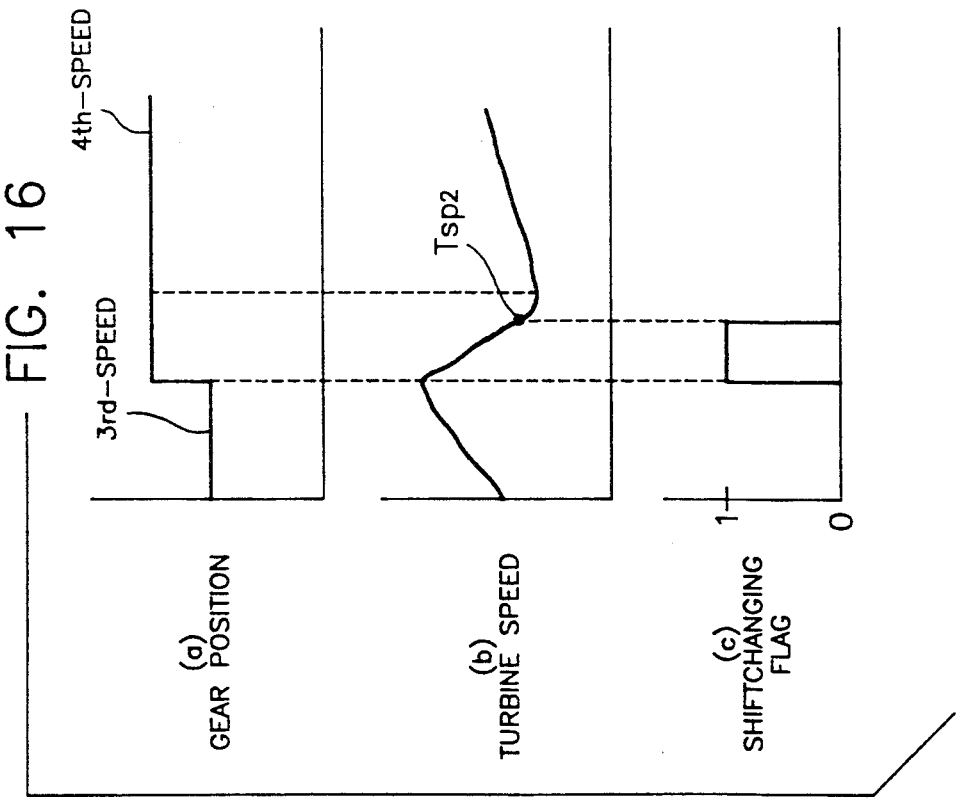
FIG. 16 is an explanatory view of shift-up operation from third gear to fourth gear in accordance with the shift change judge routine (2)

The reference values Tsp1 and Tsp2 correspond to the turbine speed when the shift change is completed, but include some hysteresis as shown in FIGS. 16 and 17. In FIG. 17, it can be seen that the reference value Tsp1 is determined so as to be a little bit smaller than the turbine speed when the shift-up operation has completed. On the other hand, from FIG. 16, it can be seen that the reference value Tsp2 is determined so as to be a little bit larger than the turbine speed when the shift-down operation has been completed.

Figure 19:
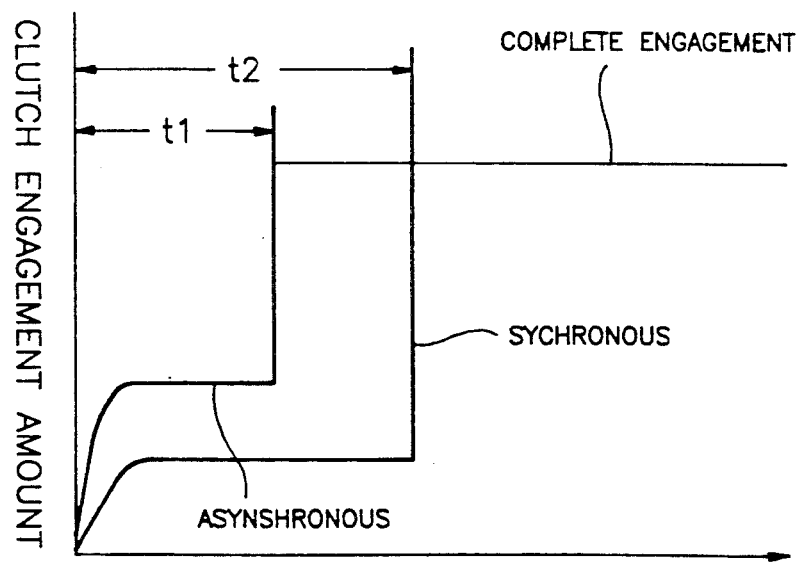
FIG. 19 is an explanatory view of an operation of the interruption routine (2).
Figure 18:
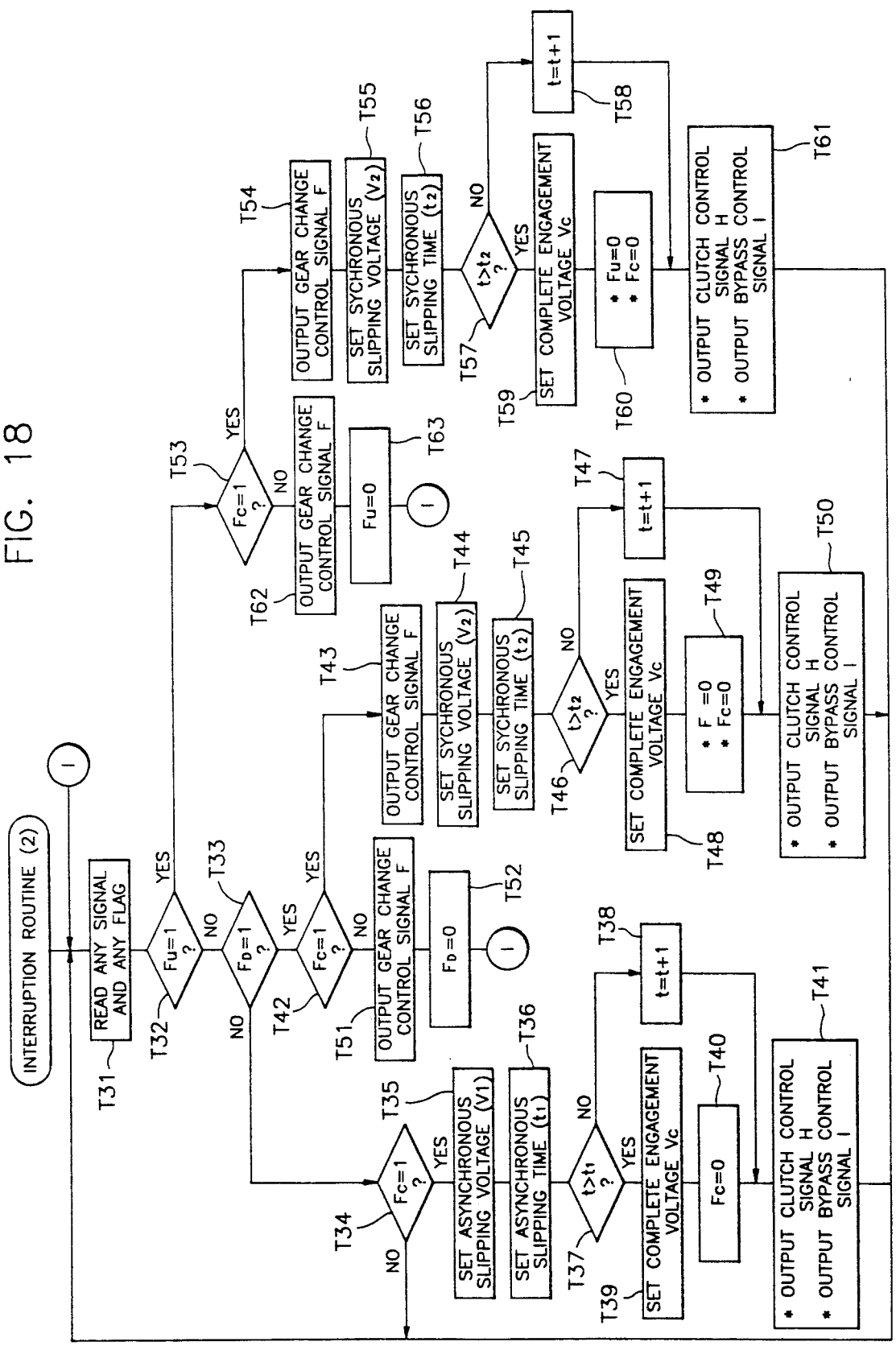
FIG. 18 is a flow diagram representative of an interruption routine (2) of the second embodiment in accordance with the present invention.

Referring now to FIGS. 18 and 19, another embodiment of the present invention will now be explained.

This embodiment is carried out according to an interruption routine shown in FIG. 18. The controller 22 reads, in step T31, each signal A, B, C and D from the sensors 23 to 26 in FIG. 1 and each value of the flag Fu, FD and Fc obtained in the sub routines in FIGS. 3, 5 and 6. In steps T32 to T34, the controller 22 judges if the flags Fu, Fd and Fc are "1" or not.

When the controller 22 judges the flag Fc is "1" in step T34, which will occur only when a supercharging requirement occurs without shift change requirement, the controller 22 sets an asynchronous slipping voltage V1 for the electromagnetic clutch 16 in step T35, and sets an asynchronous slipping time t1 in step T36. The asynchronous slipping voltage V1 is smaller than a complete engagement voltage Vc. The term "complete engagement voltage" Vc means a voltage which is required to connect or engage the electromagnetic clutch 16 with the supercharger 10 without slipping.

Then, the controller 22 judges, in step T37, if a clutch timer t exceeds the slipping time t1 or not. If not, the clutch timer t is incremented in step T38 by adding "1" and proceeds to step T41. In step T41, the controller 22 outputs the clutch control signal H and the bypass control signal I. Therefore, the electromagnetic clutch 16 is engaged, with asynchronous slip, with the supercharger 10. The bypass control signal I is obtained in the same manner as step S81 of the flow chart in FIG. 6.

When the clutch timer t exceeds the slipping time t1, the controller 22 performs steps T39 and T40 to set the complete engagement voltage Vc and to reset the flag Fc to "0", and proceeds to the step T41. Accordingly, the electromagnetic clutch 16 can be completely engaged after time period of t1 as shown in FIG. 19.

However, when the flag FD is "1" in step T33, the controller 22 proceeds to step T42 and judges if the clutch flag Fc is "1" or not. If the judgment is Fc=1, which is the one when both a shift-down requirement and a supercharger requirement are present, in step T43, the controller 22 outputs the gear change signal F to the shift solenoid valves 20a, 20b and 20c so that the automatic transmission 3 can be shifted-down. In step T44, the controller 22 sets a synchronous slipping voltage V2, and in step T45, the controller 22 sets a synchronous slipping time t2. The synchronous voltage V2 is smaller than the asynchronous voltage V1. The synchronous slipping time t2 is larger than the asynchronous slipping time t1.

Then, the controller 22 judges if the clutch timer t exceeds the synchronous slipping time t2 or not in step T46. If the judgment is "No", the clutch timer is incremented by adding "1" in step T47, and the controller 22 proceeds to step T50 to output the clutch control signal H and the bypass control signal I. Therefore, the electromagnetic clutch 16 can be engaged, with synchronous slip, to the supercharger 10. When the clutch timer t exceeds t2 in step T46, the controller 22 performs steps T48 and T49 to set the complete engagement voltage Vc and to reset the flags FD and Fc to "0", and proceeds to step T41. Accordingly, the electromagnetic clutch 16 can be completely engaged after time period t2, as is clear from FIG. 19.

Therefore, even if the engagement operation of the electromagnetic clutch 16 and the shift-down operation of the automatic transmission are performed synchronously, or at the same time, the engine output shaft can be prevented from receiving a large amount of shock, because the slipping engagement of the electromagnetic clutch can absorb such shock sufficiently.

In this embodiment, when the shift-down operation occurs, the shift-down operation is performed prior to the electromagnetic clutch engagement by some time interval. Thus, a quick response in the shift-down operation of the automatic transmission 3, as well as less shock in the electromagnetic clutch 16, can be expected.

When the flag Fc is not "1" in step T42, the controller 22 outputs the gear shift signal F to the shift solenoid valves 20a, 20b and 20c in step T51, and resets the flag FD to "0".

When the flag Fu is "1" in the step T32, the controller 22 proceeds to step T53 and judges if the clutch flag Fc is "1" or not. If the judgment is Fc=1, which will be the case when both of shift-up requirement and supercharger requirement happen, in step T54, the controller 22 outputs the gear change signal F to the shift solenoid valves 20a, 20b and 20c so that the automatic transmission 3 can be shifted-up. In step T55, the controller 22 sets a synchronous slipping voltage V2, and in step T56, the controller 22 sets a synchronous slipping time t2.

Then, the controller 22 judges if the clutch timer t exceeds the synchronous slipping time t2 or not in step T57. If the judgment is "No", the clutch timer is incremented by adding "1" in step T58, and the controller 22 proceeds to step T61 to output the clutch control signal H and the bypass control signal I. Therefore, the electromagnetic clutch 16 can be engaged, with synchronous slip, to the supercharger 10. When the clutch timer t exceeds t2 in the step T57, the controller 22 performs steps T59 and T60 to set the complete engagement voltage Vc and to reset the flags Fu and Fc to "0", and proceeds to the step T61. Accordingly, the electromagnetic clutch 16 can be completely engaged after time period t2, as is clear from FIG. 19.

Therefore, even if the engagement operation of the electromagnetic clutch 16 and the shift-up operation of the automatic transmission are performed synchronously, i.e., at the same time, the engine output shaft can be prevented from receiving a large amount of shock, because the slipping engagement of the electromagnetic clutch absorbs such shock sufficiently.

When the flag Fc is not "1" in the step T53, the controller 22 outputs the gear shift signal F to the shift solenoid valves 20a, 20b and 20c in step T51, and resets the flag Fd to "0".

The present invention can be embodied in other specific forms without departing from the spirit or essential characteristics thereof. The described above embodiments, therefore, are to be considered in all respects as illustrative and not restrictive, the scope of the present invention being defined by the appended claims rather than by the foregoing description. All changes which come literally within and in the range of equivalency of the claims are therefore intended to be embraced by the claims.

What is claimed is:

1. A control system for a power train having an engine, an automatic transmission, and supercharger means provided in an intake passage of the engine for supplying compressed air into a cylinder of the engine, comprising:

first detecting means for detecting a demand for adding supercharging power, second detecting means for detecting a demand for shifting a gear stage of the automatic transmission, and control means for controlling both the supercharger means and shifting of the automatic transmission in response to the first and the second detecting means so that the supercharger means and the automatic transmission have an interrelation with each other in initiations of operations thereof when both the demand for adding the supercharging power and the demand for shifting the gear stage of the automatic transmission occur at the same time, wherein the control means controls the supercharger and the automatic transmission so that operation of one of the supercharger and the automatic transmission occurs prior to operation of the other of the supercharger and the automatic transmission by a predetermined time interval, the predetermined time interval being determined based on a signal representative of oil temperature in the automatic transmission.

2. The control system in accordance with claim 1, in which the predetermined time interval is determined so as to be larger as the oil temperature becomes lower.

3. The control system in accordance with claim 1, in which the second detecting means is a shift-down detecting means for detecting a demand for a shift-down operation, and the control means outputs a shift-down signal to the automatic transmission prior to outputting an actuation signal to the surcharger means.

4. A control system for a power train having an engine, an automatic transmission, and supercharger means provided in an intake passage of the engine for supplying compressed air into a cylinder of the engine, comprising:

first detecting means for detecting a demand for adding supercharging power, second detecting means for detecting a demand for shifting a gear stage of the automatic transmission, and control means for controlling both the supercharger means and shifting of the automatic transmission in response to the first and the second detecting means so that the supercharger means and the automatic transmission have an interrelation with each other in initiations of operations thereof when both the demand for adding the supercharging power and the demand for shifting the gear stage of the automatic transmission occur at the same time, wherein the second detecting means is a shift-up detecting means for detecting a demand for a shift-up operation, and the control means outputs an actuation signal to the supercharger means prior to outputting a shift-up signal to the automatic transmission.

5. The control system in accordance with claim 4, in which the second detecting means is a shift-down detecting means for detecting a demand for a shift-down operation, and the control means outputs a shift-down signal to the automatic transmission prior to outputting an actuation signal to the supercharger means.

6. A control system for a power train having an engine, an automatic transmission, and supercharger means provided in an intake passage of the engine for supplying compressed air into a cylinder of the engine, comprising:

first detecting means for detecting a demand for adding supercharging power, second detecting means for detecting a demand for shifting a gear stage of the automatic transmission, and control means for controlling the supercharger means and the automatic transmission, said control means including judging means for judging if a demand for adding supercharging power occurs before the automatic transmission completes a shift change operation, and prohibiting means for prohibiting an operation of the supercharger means in response to an output of the judging means until the automatic transmission completes the shift change operation, wherein the prohibiting means prohibits the operation of the supercharger means for a predetermined time period, and the predetermined time period is determined based on a signal representative of oil temperature in the automatic transmission.

7. The control system in accordance with claim 6, in which the second detecting means is a shift-down detecting means for detecting a demand for a shift-down operation, and the control means outputs a shift-down signal to the automatic transmission prior to outputting an actuation signal to the supercharger means.

8. A control system for a power train having an engine, an automatic transmission, and supercharger means provided in an intake passage of the engine for supplying compressed air into a cylinder of the engine, comprising:

first detecting means for detecting a demand for adding supercharging power, second detecting means for detecting a demand for shifting a gear stage of the automatic transmission, control means for controlling the supercharger means and the automatic transmission, said control means including judging means for judging if a demand for adding supercharging power occurs before the automatic transmission completes a shift change operation in response to the first and the second detecting means, and operating means for operating the supercharger means after the automatic transmission has completed a shift change operation in response to an output of the judging means, and turbine speed detecting means for detecting a rotational speed of a turbine runner in the automatic transmission, and wherein said operating means judges if a shift change in response to the turbine speed detecting means is completed.

9. The control system in accordance with claim 8, in which the second detecting means is a shift-down detecting means for detecting a demand for a shift-down operation, and the control means outputs a shift-down signal to the automatic transmission prior to outputting an actuation signal to the supercharger means.

10. A control system for a power train having an engine, an automatic transmission, mechanical supercharger means provided in an intake passage of the engine and driven by an output shaft of the engine for supplying compressed air into a cylinder of the engine, said mechanical supercharger means including clutch means for connecting the mechanical supercharger means with and disconnecting the mechanical supercharger means from the output shaft of the engine, comprising:

first detecting means for detecting a demand for engaging the clutch means, second detecting means for detecting a demand for shifting a gear stage of the automatic transmission, and control means for controlling the clutch means and the automatic transmission, said control means including:

judging means responsive to the first and the second detecting means for judging if both the demand for engaging the clutch means of the supercharger means and the demand for shifting the gear stage of the automatic transmission occur at the same time, and operating means for operating the supercharger means so that the supercharger means is not fully engaged with the engine output shaft, wherein the clutch means is connected with the output shaft of the engine by slipping engagement.

11. The control system for a power train in accordance with claim 10 in which the slipping engagement is longer in time and smaller in engagement force when both the demand for engaging the clutch means of the supercharger means and the demand for shifting the gear stage of the automatic transmission occur at the same time as compared with other conditions.

12. The control system in accordance with claim 10, in which the second detecting means is a shift-down detecting means for detecting a demand for a shift-down operation, and the control means outputs a shift-down signal to the automatic transmission prior to outputting an actuation signal to the supercharger means.

* * * * *